United States Patent
Wiktor et al.

(10) Patent No.: US 9,024,600 B2
(45) Date of Patent: May 5, 2015

(54) PWM CONTROL APPARATUS FOR AVERAGE OUTPUT CURRENT BALANCING IN MULTI-STAGE DC-DC CONVERTERS

(71) Applicant: Texas Instruments Incorporated, Dallas, TX (US)

(72) Inventors: Stefan Wlodzimierz Wiktor, Raleigh, NC (US); Joseph Maurice Khayat, Bedford, NH (US); Brian Thomas Lynch, Brookline, NH (US)

(73) Assignee: Texas Instruments Incorporated, Dallas, TX (US)

( * ) Notice: Subject to any disclaimer, the term of this patent is extended or adjusted under 35 U.S.C. 154(b) by 121 days.

(21) Appl. No.: 13/948,404

(22) Filed: Jul. 23, 2013

(65) Prior Publication Data
US 2014/0097818 A1  Apr. 10, 2014

Related U.S. Application Data

(60) Provisional application No. 61/712,071, filed on Oct. 10, 2012.

(51) Int. Cl.
*H02M 3/158* (2006.01)
*H02M 3/156* (2006.01)
*H02M 3/157* (2006.01)

(52) U.S. Cl.
CPC .............. *H02M 3/156* (2013.01); *H02M 3/157* (2013.01); *H02M 3/1584* (2013.01)

(58) Field of Classification Search
CPC ........................... H02M 3/158; H02M 3/1584
USPC .................. 323/225, 271, 272, 288, 350, 351
See application file for complete search history.

(56) References Cited

U.S. PATENT DOCUMENTS

| | | | |
|---|---|---|---|
| 6,819,577 B1 | 11/2004 | Wiktor et al. | |
| 6,850,045 B2 | 2/2005 | Muratov et al. | |
| 7,372,240 B2 | 5/2008 | Khayat et al. | |
| 7,705,689 B2 | 4/2010 | Harrison et al. | |
| 7,855,903 B2 | 12/2010 | Khayat et al. | |
| 7,903,433 B2 | 3/2011 | Carpenter et al. | |
| 8,085,015 B2 * | 12/2011 | Lee ............................... | 323/272 |
| 8,217,636 B2 | 7/2012 | Khayat et al. | |
| 8,773,104 B2 * | 7/2014 | Chen et al. .................... | 323/303 |
| 8,830,405 B2 * | 9/2014 | Murakami .................... | 348/730 |
| 2008/0088284 A1 * | 4/2008 | Weng ............................ | 323/271 |
| 2011/0062932 A1 * | 3/2011 | Hawkes ........................ | 323/288 |

OTHER PUBLICATIONS

Huang, et al., "A Scalable Multiphase Buck Converter With Average Current Share Bus", International Rectifier, North Kingstown, RI, as presented at APEC 03, 7 pgs., Nov. 5, 2003.

\* cited by examiner

*Primary Examiner* — Gary L Laxton
(74) *Attorney, Agent, or Firm* — William B. Kempler; Frank D. Cimino (57) ABSTRACT

Pulse width modulation controller apparatus and techniques are presented for balancing output currents of DC-DC converter stages in a multi-stage DC-DC conversion system in which a reference current is provided according to an input voltage and the value of a connected resistor, and a correction current output signal is generated that represents the difference between an average converter stage load current and the local load current, with the on-time of the PWM output signal being generated by charging a capacitance using a charging current obtained by offsetting the reference current output signal with the correction current output signal.

20 Claims, 5 Drawing Sheets

FIG. 7

PWM CONTROL APPARATUS FOR AVERAGE OUTPUT CURRENT BALANCING IN MULTI-STAGE DC-DC CONVERTERS

REFERENCE TO RELATED APPLICATION

This application claims priority to and the benefit of U.S. Provisional Patent Application Ser. No. 61/712,071, filed on Oct. 10, 2012 and entitled CURRENT SHARE ARCHITECTURE IN STACKABLE MULTIPHASE CONSTANT ON TIME CONTROL, the entirety of which is incorporated by reference herein.

FIELD OF THE INVENTION

The present disclosure relates to multiphase/multi-channel DC-DC power converters, and pulse width modulation (PWM) controllers therefor.

BACKGROUND

DC-DC converters come in many different forms, and include one or more switches that are selectively actuated to provide a controlled DC output voltage or current based on a received DC input, where regulation of the output power is provided by controlling the control pulse width or on time of the signaling provided to the converter switch or switches. Constant on time (COT) converter architectures operate to regulate the converter output by adjusting the so-called "off time" between pulses of a steady "on time", with the adjustments to the off time effectively varying the converter operating frequency for output regulation. Fixed frequency converters begin the converter pulses at regular intervals, and the on time of the individual pulses is varied to control the output. Regulating either or both of the on time or off time (or frequency) of the switching control signaling is generally known as pulse width modulation or PWM control. In a multi-stage conversion system, two or more converter stages are connected to individually contribute to the output current of the system, and the outputs of the individual stages are typically connected to the system output via a corresponding output inductor. Mismatching between the switches and/or the output inductors of the individual power converter stages can lead to uneven or imbalanced load sharing conditions. However, no stage load balancing techniques have thus far been developed for constant on time converters, and it is desirable to provide techniques and apparatus for more uniformly balancing the output contribution of individual stages in a multi-stage DC-DC converter.

SUMMARY

The present disclosure provides DC-DC converter pulse width modulation apparatus and techniques for balancing the output currents of individual converter stages in a multi-stage DC-DC converter. The concepts of the present disclosure find particular utility in association with constant on time converter architectures to provide balancing adjustment to an otherwise constant on time for individual stages or channels of a multi-stage converter to facilitate uniform load sharing among the converter stages. A reference current is provided in the individual stages according to an input voltage and the value of a connected resistor, and a correction current output signal is generated that represents the difference between an average converter stage load current and the local load current. The on time of the PWM output signal is set by charging a capacitance using a charging current created by offsetting the reference current output signal with the correction current output signal in particular implementations, and the reference current may be offset in other embodiments using a phase or frequency correction current signal based at least partially on a phase or frequency difference between a reference clock signal and a sampled PWM output signal.

PWM controllers and integrated circuits are provided in accordance with one or more aspects of the present disclosure. The controller includes a reference circuit which provides a reference current signal according to an input voltage and the value of a connected resistor, as well as a balancing circuit which controls a correction current signal representing the difference between a load current provided by a connected DC-DC converter stage and an average converter stage load current in a multi-stage DC-DC conversion system. In addition, the PWM controller includes a summing circuit which offsets the reference current output signal with the correction current output signal to provide a capacitor charging current signal, as well as a pulse generator including a switched capacitor circuit which alternately discharges and charges a capacitance and provides a PWM output signal with an on time determined by the amplitude of the capacitor charging current.

In certain embodiments, the balancing circuit includes an amplifier providing an output representing the converter stage output current, along with a current mirror providing first and second current signals to corresponding resistors based on the amplifier output, where the first resistor is connected to an input terminal to receive a voltage signal representing an average converter stage load current of other DC-DC converter stages. The balancing circuit in certain implementations further includes a transconductance amplifier which controls the correction current output signal based on the difference between voltages across the first and second resistors.

The switched capacitor circuit in certain embodiments includes a capacitor connected to the summing circuit and a switch circuit which discharges the capacitor, a comparator outputting a pulse signal based on comparison of the capacitor voltage with a threshold voltage, and a flip-flop with a first input connected to the comparator output, a second input receiving a trigger signal to begin a new PWM period, a first output providing the PWM output signal, and a complementary second output controlling the switch circuit. In certain implementations, a summing circuit node is directly connected to the non-inverting input of the comparator and to the reference circuit to receive the reference current output signal and to provide the capacitor charging current signal as the reference current output signal offset by the correction current output signal.

In certain embodiments, the controller is configurable as a master or a slave, and the PWM controller includes an oscillator to generate a reference clock signal as well as a detector circuit generating a phase or frequency error signal representing a difference in phase or frequency between the reference clock signal and a sampled pulse width modulation output signal from the pulse generator circuit. The reference circuit provides a phase or frequency correction current output signal at least partially according to the phase or frequency error signal. In certain implementations, the summing circuit node is directly connected to the non-inverting comparator input and to the reference circuit to receive the reference current output signal. A switching circuit selectively connects the summing circuit node to offset the reference current output signal with the phase or frequency correction current when configured as a master, or offsets the reference current output signal with the correction current output signal when configured as a slave. In other implementations, the summing circuit node is connected to receive the reference current output signal and the phase or frequency correction output current signal, and a switch connects the correction current output signal to the summing circuit node if the controller is configured as a slave.

Further aspects of the disclosure involve an integrated circuit (IC), including a balancing circuit with an amplifier providing an output based on a voltage input signal representing a converter stage output current, as well as a current mirror circuit and first and second resistors. The current mirror circuit provides a first current output to the first resistor at a first current mirror output node connected to receive a voltage signal from at least one other converter stage, and the current mirror circuit also provides a second current output to the second resistor at a second current mirror output node based on the first amplifier circuit output. The balancing circuit also includes a transconductance amplifier with inputs connected to the first and second current mirror output nodes, and controls a correction current output signal based on the difference between the voltages at the first and second current mirror nodes.

The IC also includes a reference circuit providing a reference current based on a received input voltage and on the value of an internal or external resistor, and an internal node, as well as a pulse generator circuit with a capacitance connected to the internal node, a switch, and the output of the transconductance amplifier. The pulse generator circuit also includes a comparator and a flip-flop, with the comparator comparing the voltage at the internal node to a threshold voltage and providing a pulse signal at a first level when the capacitance voltage is greater than the threshold voltage and a second level when the capacitance voltage is less than the threshold. The flip-flop has a first input connected to the comparator output, a second input receiving a trigger signal to begin a new PWM period, a first output providing a pulse width modulation output signal for control of the DC-DC converter stage, and a complementary second output providing the switch control signal to place the switch circuit in the first state to discharge the capacitance. The IC in certain embodiments includes a phase management circuit providing the trigger signal based on a system clock signal, and the system clock signal may be generated internally based on a reference clock signal of an internal oscillator if the IC is configured as a master or the system clock signal is received from an input if the IC is configured as a slave.

Further aspects of the disclosure involve methods for balancing converter stage load currents in a multi-stage DC-DC conversion system, including providing a reference current in a given stage based on an input voltage and on a value of a connected resistor, providing a correction current output signal representing a difference between a load current provided by the given stage and an average converter stage load current, offsetting the reference current output signal with the correction current output signal to provide a capacitor charging current signal, and selectively charging a capacitance using the capacitor charging current to provide a pulse width modulation output signal with an on time determined by an amplitude of the capacitor charging current for the given converter stage.

DESCRIPTION OF THE VIEWS OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

One or more embodiments or implementations are hereinafter described in conjunction with the drawings, wherein like reference numerals are used to refer to like elements throughout, and wherein the various features are not necessarily drawn to scale. The present disclosure provides PWM controllers and integrated circuits as well as techniques for pulse width modulation control of a DC-DC converter stage of a multi-stage system. The various concepts of the present disclosure are hereinafter illustrated and described in the context of an exemplary multi-stage buck DC-DC converter in which master and slave power management integrated circuits are used to provide PWM control signaling to driver circuits for actuating upper and lower FET power switches to generate converter stage output currents that are combined to provide a system DC output voltage, although any suitable form of one or more electrical switching devices can be operated, directly or indirectly, by the pulse width modulation control concepts disclosed herein, and the present disclosure is not limited to FET type power switches or to buck converter topologies. In addition, an integrated circuit in accordance with the present disclosure may include power management circuitry as described for connection to external driver and switching circuitry, and/or onboard driver circuits can be provided in the IC along with one or more switches and output inductors, or any of these components may be separately provided, wherein all such variant implementations are contemplated as falling within the scope of the present disclosure.

Figure 1:
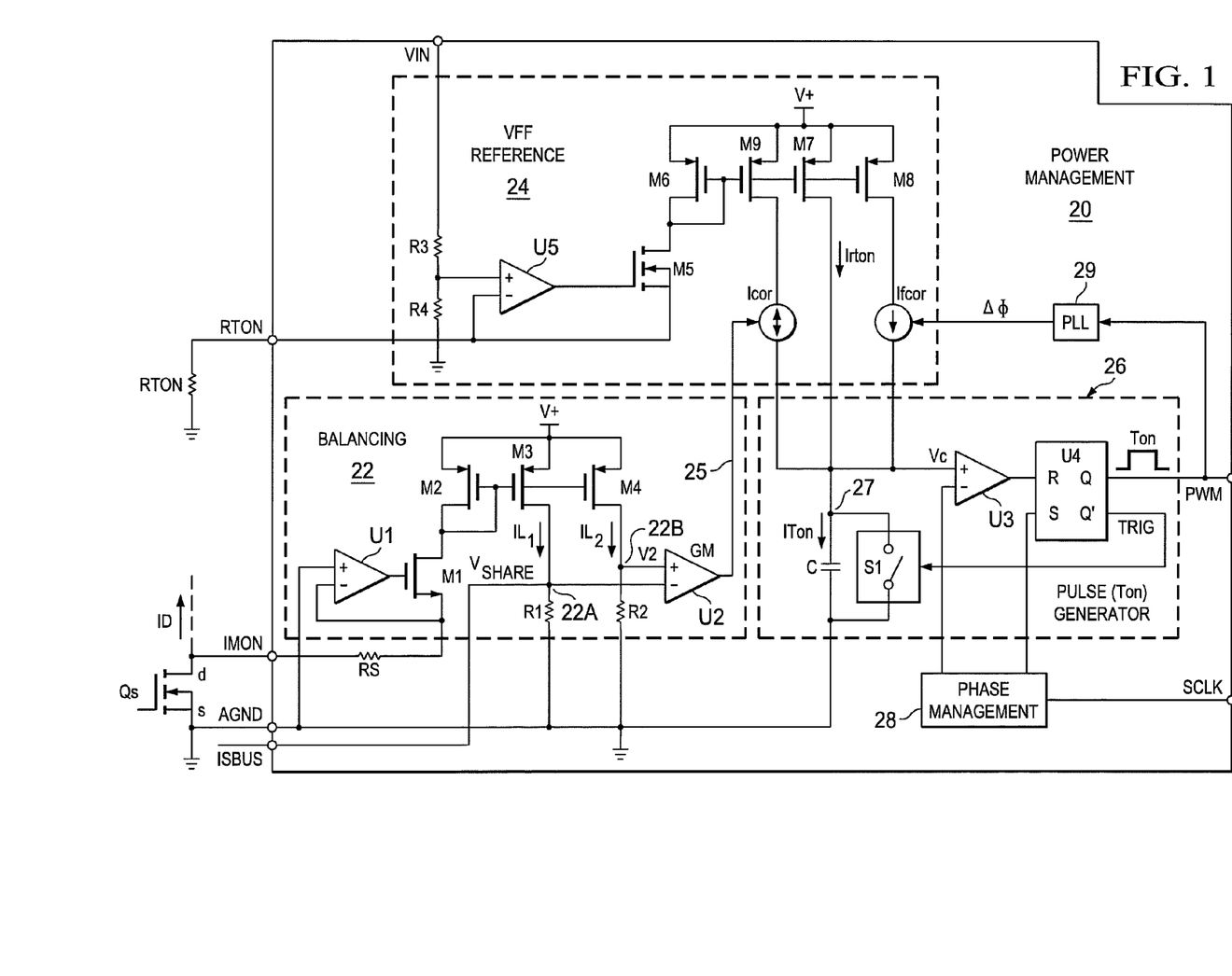
FIG. 1 is a schematic diagram illustrating an exemplary power management integrated circuit for pulse width modulation control of a DC-DC converter stage, including a pulse generator circuit providing a PWM output according to a reference current offset by a current load sharing signal in accordance with one or more aspects of the present disclosure.

FIG. 1 illustrates an exemplary power management integrated circuit 20 operating as a pulse width modulation (PWM) controller to provide a pulse width modulated control signal 21 (PWM) for use by internal or external driver circuitry to generate one or more pulse width modulated switching control signals for actuating one or more switches of an associated DC-DC converter stage. Two or more such stages, moreover, can be combined to form a multi-stage or multi-channel power conversion system 10, as further illustrated in FIG. 3 below. In addition, certain implementations provide power management ICs 20 that are individually configurable to operate as either a "master" or a "slave" in such a multi-stage system 10 for use in a constant on time (COT) power conversion system or other form of power converter.

As previously noted, COT converters typically employ frequency or "off time" adjustment for output load regulation in creating a regulated DC output voltage or current, with the PWM output signal "on time" being generally held constant. In the illustrated implementations, the frequency or off time adjustment may be implemented in a "master" power management IC 20, with the master providing synchronization clock signaling and/or data (SCLK in FIG. 1) to one or more "slave" ICs 20, although not a strict requirement of all the aspects of the present disclosure. In the illustrated implementations, moreover, the local "slave" power management ICs or controllers 20 operate to locally adjust the corresponding PWM pulse signal on time in order to facilitate balancing of the output current contributed by the stages of the multi-stage system 10. In this regard, while the described systems 10 may be referred to as COT (constant on time) systems, the local PWM on time of a given converter stage 20 may be different than that of other stages within the system 10 to facilitate load balancing. Further, the "master" PWM controller 20 in certain embodiments may manage the pulse width modulated operation of multiple stages in the system 10, for example, by controlling the relative phasing in staggered fashion, such that pulse width modulation periods are evenly distributed among multiple connected stages.

Figure 3:
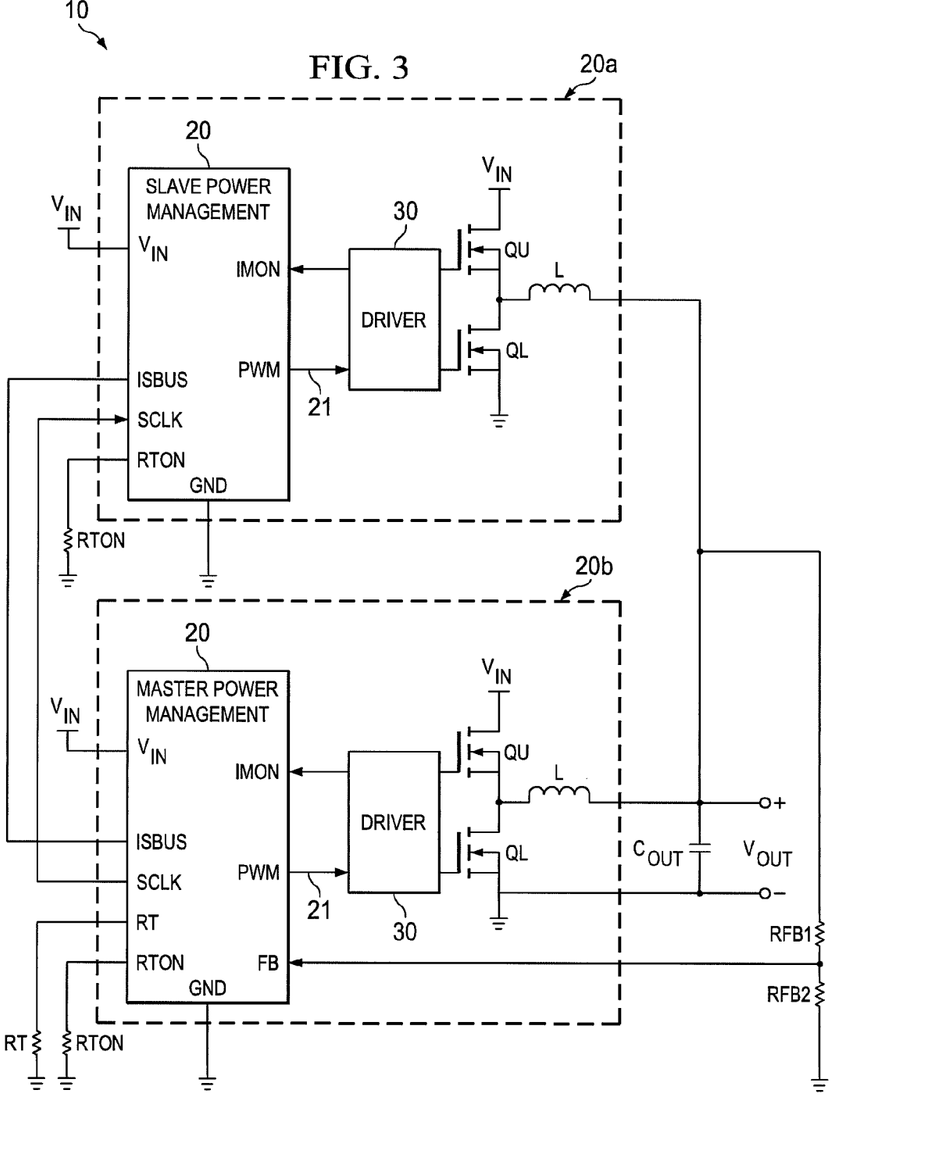
FIG. 3 is a schematic diagram illustrating an exemplary multi-stage power conversion system including a master power management PWM controller IC and a slave power management PWM controller IC operating two power converter stages to provide a DC-DC conversion system.

Referring initially to FIGS. 1-3, FIG. 1 shows an exemplary power management IC or PWM controller 20 which in one implementation has externally connectable terminals for connection with an input voltage VIN and an analog system ground AGND, as well as other electrical terminals such that multiple controllers 20 can be interconnected with one another in a multi-stage system 10 (e.g., FIG. 3). In addition, the controller 20 may be used with an external driver IC (e.g., driver circuit 30 in FIG. 3) for control of external power converter switching devices QU and QL for interconnection with other converter stages via an output inductance L, or any of the driver circuitry 30, the output switches QU, QL and/or the inductors L may be implemented in a single integrated circuit 20a together with the power management or PWM controller circuitry 20 as described herein (as shown in the dashed lines 20a in FIG. 3). In this regard, the illustrated controller 20 provides a single PWM output signal 21 which may be converted, as needed, into complementary PWM control signals in the driver circuit 30 to drive upper and lower output switches QU and QL in certain converter architectures, or a single switch may be used with the driver circuit 30 providing a switch control signal according to the received PWM output signal 21.

As best seen in FIG. 1, the PWM controller IC 20 includes a balancing circuit 22, a reference circuit 24 and a pulse generator circuit 26. The reference circuit 24 can be implemented as a voltage feedforward (VFF) reference circuit used to generate various programming currents as current signals for use by various circuits in the IC 20, including a reference current output signal Irton generated according to an input voltage VIN and a connected resistor RTON. In addition, the illustrated reference circuit 24 generates a correction current signal Icor based on VIN and RTON as well as on a correction control signal 25 from the balancing circuit 22. In certain embodiments, the resistance RTON can be provided within the IC 20, or can be an external resistor or resistor network connected to the RTON terminal. In operation, the pulse generator circuit 26 uses the reference current Irton as a baseline for setting the on time Ton of the PWM output signal 21, and the baseline signal Irton is adjusted or "offset" using one or more adjustments as described further below to facilitate load balancing among multiple power converter stages within the system 10. The balancing circuit 22 in FIG. 1 provides a control signal 25 to control the level of a correction current output signal Icor for offsetting the baseline signal Irton at an internal summing circuit node 27 (summing junction) in the pulse generator circuit 26, where the correction signal Icor represents the difference between the local stage load current contributed by the corresponding DC-DC converter stage and an average converter stage load current in the multi-stage DC-DC conversion system 10.

An internal node 27 acts as a summing junction to offset the reference current Irton with the correction current Icor to provide a capacitor charging current signal ITon (=Irton+/−Icor) to a switched capacitor circuit formed by a capacitance C, a switch circuit S1, a comparator U3, and a flip-flop U4. The internal node 27 in the illustrated embodiments is provided in the pulse generator circuit 26, although the summation for offsetting could alternatively be implemented at a summing junction or node in the reference circuit 24 or elsewhere within the power management circuit 20. In operation, the pulse generator 26 alternately charges and discharges the capacitance C, with the charging being accomplished using the capacitor charging current ITon from the summing junction 27. Although the capacitance C is illustrated as a single capacitor, and described herein as a "capacitor" or a "capacitance", the capacitance or capacitor C can be a single component or multiple capacitive circuit components connected in any suitable series, parallel and/or series/parallel configurations to provide a capacitance between the summing junction node 27 and the circuit ground AGND that can be selectively charged using the composite (offset) current ITon for comparison with a threshold to set the on time of the output pulse width modulation control signal 21.

In operation, the comparator U3 compares the capacitor voltage Vc at its non-inverting (+) input to a threshold voltage VTH connected to the inverting (−) input, and provides an output to a reset (R) input of the flip-flop U4. The flip-flop U4 in this example is a set/reset (S-R) flip-flop, although J-K or other types of flip-flops or other suitable logic circuitry can be used to implement the functionality detailed herein. The Q output of the flip-flop U4 provides the PWM output signal 21 having an on time Ton determined by the amplitude of the capacitor charging current ITon. In addition, a set (S) input receives a trigger signal TRIG to begin a new PWM period and a complementary second output Q' provides a switch control signal to place the switch circuit S1 in a closed or conductive state to discharge the capacitance C to begin each new pulse width modulation period. Releasing the complementary second output Q' in response to the falling edge of the next trigger signal TRIG thereafter allows the capacitor C to charge via the charging current ITon and the process repeats. The exemplary pulse generator 26 is just one example in which a current charged capacitor voltage is compared by U3 to a fixed threshold voltage VTH to generate an ON time. In practice, other types and forms of a Ton generator are possible, including without limitation a fixed current to charge a capacitor, and a programmable current through a resistor to program a variable threshold; programming a capacitor charge rate as shown, but mirroring-and-inverting the signal and summing it with a threshold voltage to impose a sawtooth on both inputs of a comparator; and/or combinations of these where the threshold is varied. Any suitable technique such as these methods could be used to generate a trigger pulse to reset the SR-flip flop U4.

Figure 2:
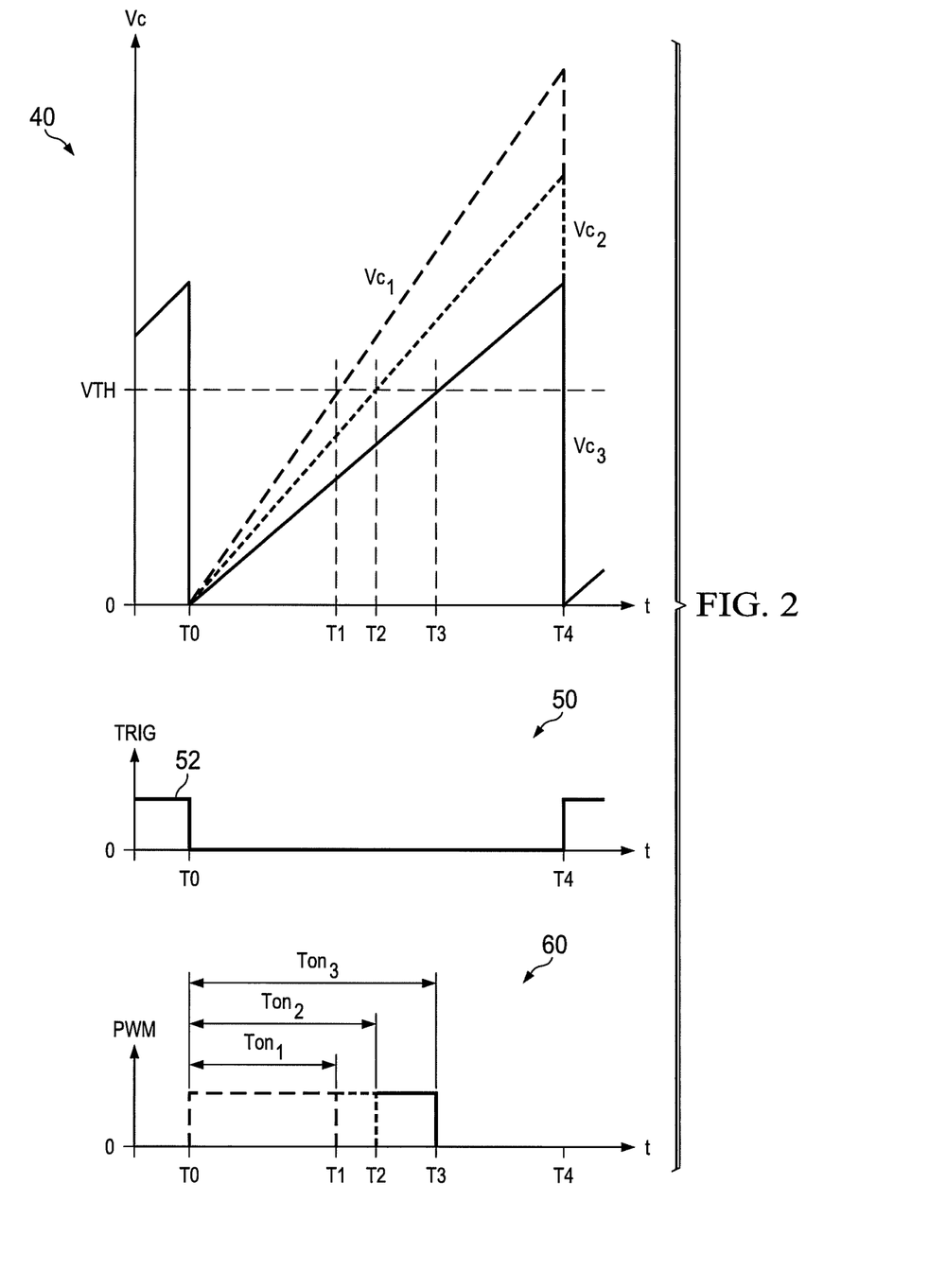
FIG. 2 shows graphs illustrating adjustment of the on time of the DC-DC converter stage pulse width modulation control output for uniform load-balancing between converter stages.

FIG. 2 provides graphs 40, 50 and 60 respectively illustrating three exemplary capacitor voltage curves $Vc_1$, $Vc_2$ and $Vc_3$, as well as the trigger signal TRIG 52 and PWM pulse signals 62 of three different corresponding on times $Ton_1$, $Ton_2$ and $Ton_3$ as a function of ITon. As noted above, the on time Ton of the PWM output signal 21 (62 in the graph 60 of FIG. 2) is determined by the amplitude of the capacitance charging current ITon in an inversely proportional manner, with the on time Ton increasing with decreasing charging current levels ITon. In this manner, the time needed for the capacitor voltage Vc to rise to the threshold level VTH is adjusted by the selective offsetting of the baseline reference current signal Irton at the summing node 27 of the pulse generator circuit 26. In the example of FIG. 2, for instance, charging of the capacitor C begins at T0, at which time the pulse signal 62 goes from a zero state to a "1" state (rising edge), and the complementary output Q' of the flip-flop U4 opens the switching circuit S1 to allow the capacitor C to begin charging according to the charging current Iton. For a given threshold voltage level VTH as seen in the graph 40 of FIG. 2, a relatively high charging current Iton causes the capacitor voltage $Vc_1$ to reach the threshold level somewhat quickly at time T1, thereby completing the corresponding PWM signal on time $Ton_1$ at time T1. If the resulting stage output current is somewhat greater than the average stage current, the balancing circuit 22 decreases the correction current level Icor, thereby decreasing the resulting adjusted capacitor charging current Iton, causing a lowering of the capacitor charging voltage curve slope $Vc_2$ (graph 40 in FIG. 2) which reaches the threshold level VTH at a later time T2, resulting in a corresponding longer PWM on time $Ton_2$ as seen in graph 60. Similarly, further decrease in the correction current Icor and the resulting adjusted charging current Iton again reduces the capacitor voltage curve slope $Vc_3$, thereby further lengthening the on time $Ton_3$ of the PWM pulse 62.

In the illustrated embodiment, moreover, the controller IC 20 includes an onboard phase management circuit 28 providing a trigger signal TRIG to the set (S) input of the flip-flop U4 based on a system clock signal SCLK. Where the controller 20 is configured as a master, the system clock signal SCLK is generated internally based on a reference clock signal of an internal oscillator (as described further in connection with FIG. 5 below), and the system clock signal SCLK is received as an input if the controller 20 is configured as a slave. For a given operating frequency set according to the synchronization clock signal SCLK, the time between successive pulses of the trigger signal TRIG from the phase management circuit 28 is essentially constant at steady state, and offsetting the baseline current Irton according to the correction current Icor changes the PWM output on time Ton, thereby urging the output level of the associated DC-DC converter stage to increase or decrease as necessary such that the output current provided by a given converter stage is commensurate with that provided by one or more of the other associated stages in a multi-stage conversion system 10.

In such a multi-channel system 10, therefore, the PWM controller 20 configured as a master will provide the synchronization clock signal SCLK or information as an output, and this is received by the connected slave controllers 20, with the master controller 20 (FIG. 3) monitoring the overall output voltage $V_{OUT}$ across an output capacitance $C_{OUT}$ via a feedback input FB receiving a voltage from a voltage divider circuit including feedback resistors RFB1 and RFB2 and selectively adjusting the frequency of the main system clock information SCLK in order to regulate the output voltage of the entire system 10 in a closed loop fashion by frequency adjustment. At the same time, the slave controllers 20 utilize the selective reference current offsetting techniques described above in the pulse generator 26 to adjust the local on times Ton to facilitate uniform balancing of output current contributions by each slave converter stage of the system 10. In this regard, even though the local on times Ton of the individual converter stages may be different from one another, the system as a whole implements constant on time (COT) operation with variable frequency used to regulate the system output.

The balancing circuit 22 in the embodiment of FIG. 1 includes an amplifier circuit including an op amp U1 and a sense resistor RS along with an N-channel output FET M1 providing an amplifier output based on a local load current feedback voltage input signal representing a converter stage output current Id, wherein the signal in this case is a voltage between a current monitor input terminal IMON and the analog ground connected to the ground terminal AGND. In practice, the load current feedback signal may be obtained by sensing the voltage across a sense FET Qs (e.g., or across a sense resistor, not shown), which in turn, may be connected in a converter stage output drive circuit, such as in series with one of the converter stage output switching devices QU or QL in FIG. 3. In this manner, the drain current Id conducted through the channel of the sense FET Qs is representative of the load current conducted by a corresponding converter stage output switch QU or QL, and the drain-source voltage across Qs provides a voltage signal to the feedback input terminal IMON representative of the load current of the associated power converter stage. The op amp U1 senses this voltage via sense resistor RS and provides a gate signal to M1 to create a corresponding current through M1 as an input to a P-channel FET M2 which forms a current mirror circuit with P-channel FETs M3 and M4 connected to a positive supply voltage V+.

The first current mirror output FET M3 provides a first current signal $IL_1$ to a first resistor R1 connected at node 22a based on the amplifier output from U1, M1. In addition, the second current mirror output FET M4 provides a second current signal $IL_2$ to a second resistor R2 at node 22b based on the amplifier output. The first resistor R1, moreover, is connected to an input terminal ISBUS to receive a voltage signal representing an average converter stage load current of one or more other DC-DC converter stages in the system 10. An example of this is seen in FIG. 3, in which the ISBUS terminals of the slave and master PWM controller ICs 20 are connected to one another. The first and second resistors R1 and R2 are of substantially equal resistance and the first and second transistors M3 and M4 of the current mirror circuit are substantially matched to one another in certain embodiments, although not a strict requirement. In the illustrated example, with matched transistors M3, M4 and equal resistors R1 and R2, the currents $IL_1$ and $IL_2$ are each substantially proportional to the load current of the associated DC-DC converter stage. Provision of the current $IL_1$ to the first current mirror output node 22a and connection of this node to the balancing voltage input terminal (ISBUS) creates a voltage $V_{SHARE}$ at the first current mirror output node 22a which is proportional to an average stage output load current of the multi-stage DC-DC conversion system 10 according to the following equation (1):

$$V_{SHARE} = \sum_{n=1}^{N} IL_n \cdot \frac{\sum_{n=1}^{N} R1_n}{N}, \quad (1)$$

where $IL_n$ is the converter stage output current of an $n^{th}$ DC-DC converter stage, and $R1_n$ is a resistance of the first resistor (R1) of the $n^{th}$ DC-DC converter stage. Consequently, if the connected power converter stage is providing its share of the full output load current, the voltage $V_{SHARE}$ at the node 22a would be the same as that of node 22b. However, as noted above, variations in the output inductors L and/or in the converter stage switches QU, QL may cause imbalance between two or more stages of the multi-staged system 10.

In order to facilitate output current load balancing among multiple DC-DC converter stages, the balancing circuit 22 further provides a transconductance (GM) amplifier or other suitable amplifier U2 providing a correction control signal 25 to control the correction current output signal Icor provided by the reference circuit 24 based on any difference between voltages across the first and second resistors R1 and R2 (e.g., any difference between the local load current signal voltage V2 and the shared average load current signal voltage $V_{SHARE}$ in FIG. 1). The transconductance amplifier U2 in this case operates as a voltage controlled current source, and provides an output control signal 25 proportional to its input voltage, with the controlled correction current output signal Icor thus representing any deviation of the local load current from the system average.

As best seen in FIG. 1, the reference circuit 24 includes a resistive voltage divider formed by resistors R3 and R4 connected in series with one another between the input voltage VIN and the circuit ground node (AGND), with the connection point of R3 and R4 being provided to the non-inverting input (+) of an op amp U5 whose inverting input (−) is connected to a terminal RTON for connection to the analog ground through an internal or external resistance RTON. In one possible example, the values of R3 and R4 are set such that the non-inverting input of U5 is at a voltage approximately equal to 0.10 VIN, although not a strict requirement of the present disclosure. The output of U5 provides a gate signal to an input FET M6 of a current mirror formed by P-channel FETs M6-M9. In this embodiment, FET M7 provides the nominal or baseline reference current output signal Irton to the pulse generator circuit 26 for selective offsetting according to the correction current output signal Icor by connection at a common internal node 27 or other summing circuit for charging a capacitor C. In the illustrated voltage feedforward reference circuit 24, moreover, a second current mirror output transistor M8 provides a second reference current output Ifcor to the pulse generator circuit 26, in this case modified or set according to a phase frequency error signal Δφ from a phase locked loop circuit 29 as described further in connection with FIGS. 5-7 below. Also, a third current mirror output transistor M9 provides the correction current signal Icor based at least partially on the control signal 25 from the balancing circuit 22. In other possible implementations, the correction current Icor can be provided to the summing node 27 from the transconductance amplifier output.

Figure 4:
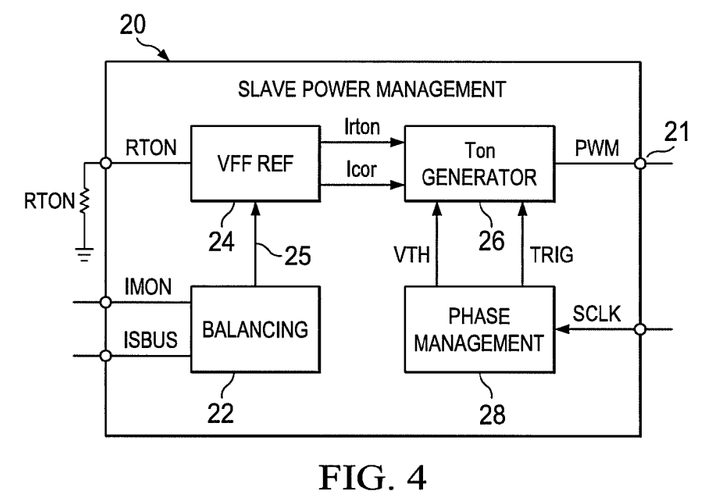
FIG. 4 is a schematic diagram illustrating an exemplary slave power management IC block diagram.
Figure 5:
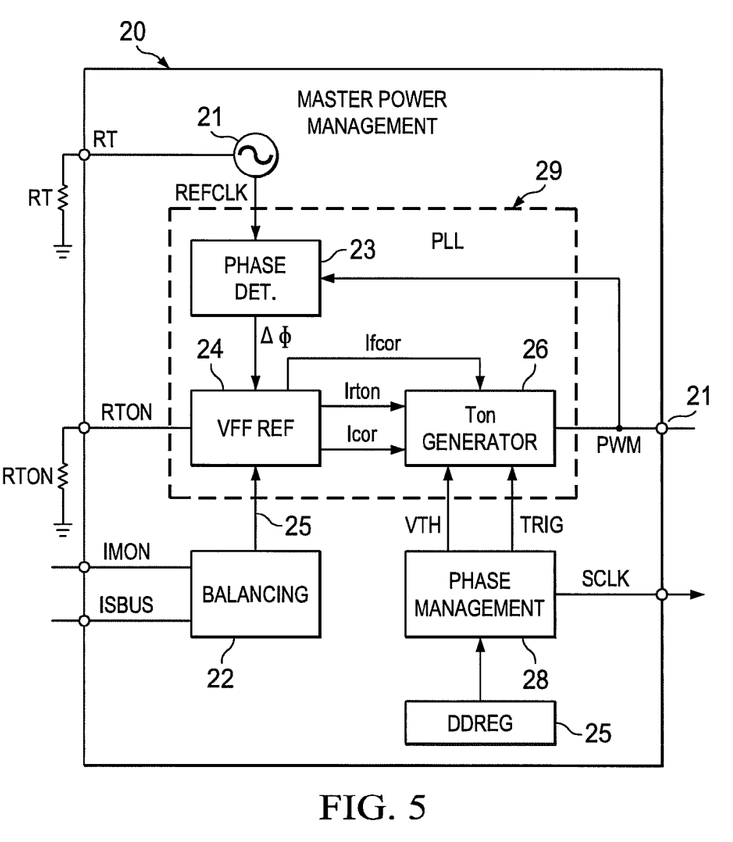
FIG. 5 is a schematic diagram illustrating a block diagram of an exemplary master power management IC.

FIGS. 4 and 5 illustrate block diagrams of exemplary embodiments of the PWM controller IC 20 configured respectively as a slave component and a master component in a multi-channel DC-DC conversion system. As seen in FIG. 4, the slave circuit 20 includes an external resistor RTON connected via an input terminal to the voltage feedforward reference circuit 24 for establishing the nominal default reference charging current output signal Irton, and the balancing circuit 22 operates as described above to control the correction current output signal Icor based on the monitored local stage current output feedback signal at the terminal IMON and the shared current balancing voltage signal $V_{SHARE}$ received at the ISBUS terminal. The pulse generator circuit 26 (labeled "Ton GENERATOR" in FIG. 4) provides the PWM output signal 21 at the PWM terminal for use by the associated converter stage, and receives the threshold voltage VTH and the trigger signal TRIG from the phase management circuit 28, where the trigger signal TRIG is provided at least partially according to synchronization clock signaling and/or values received (e.g., from a master controller 20) via the SCLK terminal.

As shown in FIG. 5, the master power management PWM controller IC 20 also has a local resistor RTON and voltage feedforward reference circuit 24 for establishing its own internal baseline reference current signal Irton, as well as a balancing circuit 22, pulse generator circuit 26 and phase management circuit 28 generally as described above. In addition, the illustrated master controller 20 includes a regulator block (DDREG) 25 connected to the phase management circuit 28, which performs control regulation of the overall system output voltage ($V_{OUT}$ in FIG. 3 above). In addition, the master controller 20 includes an oscillator circuit 21 connected by an input terminal RT to an external timing resistor RT which generates a reference clock signal REFCLK at a frequency set according to the value of resistor RT, and provides the reference clock signal to a phase or frequency detector circuit 23. In other possible embodiments, the timing resistor RT can be provided in the PWM controller IC 20. In practice, the reference clock signal could be developed any number of ways, including a combination of internal/external R and/or C and/or voltage thresholds to program an internal fixed frequency oscillator, or by an externally derived system clock. The detector circuit 23 generates a phase or frequency error signal Δφ which represents the phase or frequency difference between the reference clock signal REFCLK and a sampled pulse width modulation output signal PWM 21 from the pulse generator circuit 26, for example, as seen in FIG. 1 above. In addition, the phase detector 23, the reference circuit 24 and the pulse generator 26 together form a phase locked loop (PLL) circuit 29 as shown in FIG. 5, wherein the phase or frequency error signal Δφ is provided from the PLL 29 to the reference circuit 24 as shown in simplified form in FIG. 1.

In addition, as illustrated in FIG. 1 above, the voltage feedforward reference circuit 24 of the master PWM controller 20 in FIG. 5 provides a phase or frequency correction current output signal Ifcor based on the input voltage VIN, the value of resistor RTON and on the phase or frequency error signal Δφ from the detector circuit 23. In certain embodiments, moreover, the power management IC 20 is configurable, such as by one time programming, digital programming, external connection, or other suitable configuration means, to operate as a slave or as a master for a multi-channel power conversion system configuration 10. In this regard, a single IC design 20 may be used for both slaves and a master in a given system 10, wherein configuration as a slave may selectively disable operation of certain circuits within that controller 20 (e.g., oscillator 21, phase detector 23, regulator circuit 25, etc.).

Figure 6:
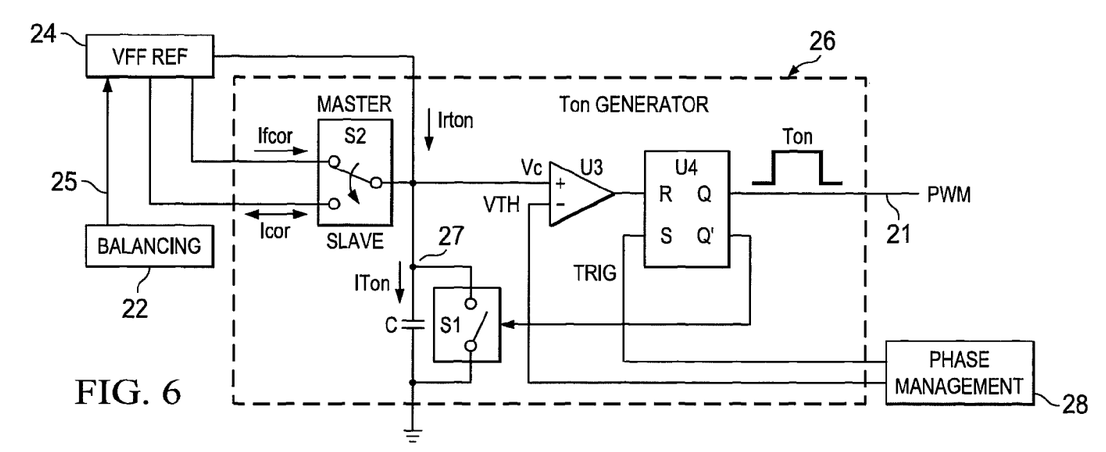
FIG. 6 is a schematic diagram illustrating another embodiment of a pulse generator circuit in the IC of FIG. 1.
Figure 7:
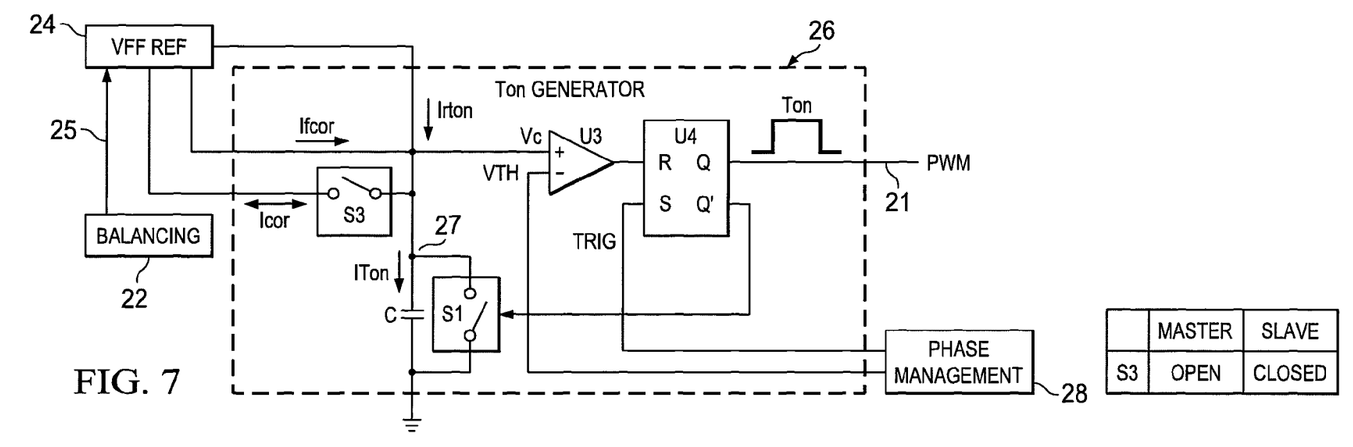
FIG. 7 is a schematic diagram illustrating yet another on time generator circuit embodiment in the IC of FIG. 1.

Referring also to FIGS. 6 and 7, the pulse generator circuit 26 of FIG. 1 above directly connects the non-inverting input (+) of the comparator U3 at the summing circuit node 27 to the reference circuit 24 to receive the reference current output signal Irton and the correction current output signal Icor to provide the capacitor charging current signal ITon as the reference current output signal Irton offset by the correction current output signal Icor.

FIG. 6 illustrates another pulse generator circuit embodiment 26 which includes a second switching circuit S2 operative according to the configured master or slave mode of the PWM controller IC 20 for selectively offsetting the reference current output signal Irton. In this embodiment, the summing node 27 of the generator circuit 26 is again directly connected to the non-inverting input of the comparator U3 and directly receives the reference current Irton, with the second switching circuit S2 selectively offsetting the reference current Irton with the correction current Icor if the device is configured as a slave, and instead offsetting Irton with the phase or frequency correction current output signal Ifcor if configured as a master controller. Thus, configuration of the device 20 as a slave implements the above-described operation as in FIG. 1 above, whereas configuration as a master causes the switch S2 to direct the current signal Ifcor to the summing circuit node 27, thereby offsetting the reference current Irton with the phase or frequency correction current output signal Ifcor for charging the capacitor C.

FIG. 7 illustrates yet another possible embodiment, in which both the reference current output signal Irton and the phase or frequency correction current output signal Ifcor are connected directly to the summing node 27. In this case, a switching circuit S3 is used to selectively connect the correction current signal Icor to the node 27 if the device 20 is configured as a slave, and otherwise the reference current Irton is offset only according to the phase or frequency correction current output signal Ifcor.

Methods are provided for load current balancing using multiple DC-DC converter stages in a multi-stage conversion system 10 in accordance with further aspects of the present disclosure. A reference current output signal (e.g., Irton) is provided in a given stage at least partially according to an input voltage (e.g., VIN) and on a value of a resistor (RTON) connected to the given DC-DC converter stage. The method further involves providing a correction current output signal (e.g., Icor) representing the difference between a load current provided by the given DC-DC converter stage and an average converter stage load current in the multi-stage DC-DC conversion system 10, as well as offsetting the reference current Irton with the correction current Icor to provide a capacitor charging current signal Iton. In addition, the method involves selectively charging a capacitance C using the capacitor charging current Iton to provide a PWM output signal (e.g., signal 21 above) with an on time (Ton) determined by the capacitor charging current amplitude for the given DC-DC converter stage.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. An integrated circuit for providing pulse width modulation control of a DC-DC converter stage in a multi-stage DC-DC conversion system, the integrated circuit comprising:
   a balancing circuit, including:
      a first amplifier circuit with an input receiving a voltage signal representing a converter stage output current, the first amplifier circuit providing a first amplifier circuit output,
      a current mirror circuit, including:
         a first transistor providing a first current output at a first current mirror output node based on the first amplifier circuit output, the first current mirror output node being connected to a balancing voltage input terminal to receive a voltage signal from at least one other converter stage of the multi-stage DC-DC conversion system, and
         a second transistor providing a second current output at a second current mirror output node based on the first amplifier circuit output,
      a first resistor connected between the first current mirror node and a circuit ground node,
      a second resistor connected between the second current mirror node and the circuit ground node, and
      a transconductance amplifier with first and second inputs respectively connected to the first and second current mirror output nodes and a transconductance amplifier output controlling a correction current output signal based on a difference between the voltages at the first and second current mirror nodes;
   a reference circuit with a reference circuit output providing a reference current based on a received input voltage and on a value of a resistor, and a correction output providing the correction current based on the received input voltage, the value of the resistor, and a correction control signal;
   an internal node connected to the reference circuit output and the correction output; and
   a pulse generator circuit, including:
      a capacitance with a first terminal connected to the internal node, and a second terminal connected to the circuit ground node,
      a switch circuit operative in a first state to discharge the capacitance according to a switch control signal,
      a comparator with a first input terminal connected to the internal node, a second input terminal connected to a threshold voltage, and a comparator output providing a pulse signal at a first level when a voltage across the capacitance is greater than the threshold voltage and a second level when the voltage across the capacitance is less than the threshold voltage, and
      a flip-flop with a first input connected to the comparator output, a second input receiving a trigger signal to begin a new pulse width modulation period, a first output providing a pulse width modulation output signal for control of the DC-DC converter stage, and a complementary second output providing the switch control signal to place the switch circuit in the first state to discharge the capacitance to begin the new pulse width modulation period.

2. The integrated circuit of claim 1, comprising a phase management circuit providing the trigger signal to the flip-flop based on a system clock signal.

3. The integrated circuit of claim 2, wherein the integrated circuit is configurable as a master or as a slave, and wherein the system clock signal is generated internally based on a reference clock signal of an internal oscillator if the integrated circuit is configured as a master, and wherein the system clock signal is received from an input if the integrated circuit is configured as a slave.

4. The integrated circuit of claim 1, wherein the internal node is connected directly to the correction output to offset the reference current with the correction current output signal.

5. The integrated circuit of claim 1, wherein the integrated circuit is configurable as a master or as a slave, the integrated circuit comprising:
  an oscillator circuit generating a reference clock signal at a frequency set according to a value of a second resistor;
  a detector circuit generating a phase or frequency error signal representing a difference in phase or frequency between the reference clock signal and a sampled pulse width modulation output signal from the pulse generator circuit;
  wherein the reference circuit includes a second reference circuit output providing a phase or frequency correction current output signal based on the received input voltage, the value of the resistor, and on the phase or frequency error signal from the detector circuit; and
  a second switching circuit operative in a first state if the integrated circuit is configured as a master to connect the phase or frequency correction current output signal to the internal node to offset the reference current with the phase or frequency correction current output signal for charging the capacitance, and in a second state if the integrated circuit is configured as a slave to connect the correction output to the internal node to offset the reference current with the correction current output signal for charging the capacitance.

6. The integrated circuit of claim 1, wherein the integrated circuit is configurable as a master or as a slave, the integrated circuit comprising:
  an oscillator circuit generating a reference clock signal at a frequency set according to a value of a second resistor;
  a detector circuit generating a phase or frequency error signal representing a difference in phase or frequency between the reference clock signal and a sampled pulse width modulation output signal from the pulse generator circuit;
  wherein the reference circuit includes a second reference circuit output connected to the internal node and providing a phase or frequency correction current output signal to the internal node based on the received input voltage, the value of the resistor, and on the phase or frequency error signal from the detector circuit; and
  a third switching circuit connected between the correction output and the internal node, the third switching circuit operative if the integrated circuit is configured as a slave to connect the correction output to the internal node to offset the reference current with the phase or frequency correction current output signal and with the correction current output signal for charging the capacitance.

7. The integrated circuit of claim 1, wherein the first and second transistors (M3, M4) of the current mirror circuit are substantially matched to one another, and wherein the first and second resistors of the first amplifier circuit are of substantially equal resistance values.

8. The integrated circuit of claim 7, wherein the multi-stage DC-DC conversion system includes an integer number N DC-DC converter stages, and wherein provision of the first current output at the first current mirror output node and connection to the balancing voltage input terminal creates a voltage $V_{SHARE}$ at the first current mirror output node proportional to an output load current of the multi-stage DC-DC conversion system according to the following equation:

$$V_{SHARE} = \sum_{n=1}^{N} IL_n \cdot \frac{\sum_{n=1}^{N} R1_n}{N},$$

where $IL_n$ is the converter stage output current of an $n^{th}$ DC-DC converter stage, and $R1_n$ is a resistance of the first resistor of the $n^{th}$ DC-DC converter stage.

9. The integrated circuit of claim 1, wherein the multi-stage DC-DC conversion system includes an integer number N DC-DC converter stages, and wherein provision of the first current output at the first current mirror output node and connection to the balancing voltage input terminal creates a voltage $V_{SHARE}$ at the first current mirror output node proportional to an output load current of the multi-stage DC-DC conversion system according to the following equation:

$$V_{SHARE} = \sum_{n=1}^{N} IL_n \cdot \frac{\sum_{n=1}^{N} R1_n}{N},$$

where $IL_n$ is the converter stage output current of an $n^{th}$ DC-DC converter stage, and $R1_n$ is a resistance of the first resistor of the $n^{th}$ DC-DC converter stage.

10. A pulse width modulation controller, comprising:
  a reference circuit providing a reference current output signal based on an input voltage and on a value of a resistor connected to the reference circuit; and
  a balancing circuit controlling a correction current output signal representing a difference between a load current provided by a connected DC-DC converter stage and an average converter stage load current in a multi-stage DC-DC conversion system;
  a summing circuit coupled with the reference circuit and configured to offset the reference current output signal with the correction current output signal to provide a capacitor charging current signal; and
  a pulse generator circuit including a switched capacitor circuit operative to alternately discharge and charge a capacitance using the capacitor charging current from the summing junction, and to provide a pulse width modulation output signal with an on time determined by an amplitude of the capacitor charging current.

11. The controller of claim 10, wherein the balancing circuit comprises:
  an amplifier circuit providing an amplifier output based on a voltage input signal representing a converter stage output current;
  a current mirror circuit providing a first current signal to a first resistor based on the amplifier output, and providing a second current signal to a second resistor based on the amplifier output, the first resistor being connected to an input terminal to receive a voltage signal representing an average converter stage load current of other DC-DC converter stages; and
  a transconductance amplifier controlling the correction current output signal based on a difference between voltages across the first and second resistors.

12. The controller of claim 11, wherein the switched capacitor circuit comprises:
a capacitor with a first terminal connected to the summing circuit, and a second terminal connected to a circuit ground node;
a switch circuit operative in a first state to discharge the capacitor according to a switch control signal;
a comparator, including
a non-inverting input connected to the summing circuit,
an inverting input connected to a threshold voltage, and
a comparator output providing a pulse signal at a first level when a voltage across the capacitor exceeds the threshold voltage and a second level when the voltage across the capacitor is less than the threshold voltage; and
a flip-flop with a first input connected to the comparator output, a second input receiving a trigger signal to begin a new pulse width modulation period, a first output providing the pulse width modulation output signal, and a complementary second output providing the switch control signal to the switch circuit.

13. The controller of claim 12:
wherein the summing circuit includes a summing circuit node directly connected to the non-inverting input of the comparator;
wherein the summing circuit node is directly connected to the reference circuit to receive the reference current output signal; and
wherein the summing circuit node is directly connected to receive the correction current output signal to provide the capacitor charging current signal as the reference current output signal offset by the correction current output signal.

14. The controller of claim 12, comprising:
an oscillator circuit generating a reference clock signal at a frequency set according to a value of a resistor connected to the oscillator circuit; and
a detector circuit generating a phase or frequency error signal representing a difference in phase or frequency between the reference clock signal and a sampled pulse width modulation output signal from the pulse generator circuit;
wherein the reference circuit provides a phase or frequency correction current output signal based on the input voltage, the value of the resistor connected to the reference circuit, and on the phase or frequency error signal from the detector circuit;
wherein the controller is configurable for use as a master or as a slave in the multi-stage DC-DC conversion system;
wherein the summing circuit includes a summing circuit node directly connected to the non-inverting input of the comparator;
wherein the summing circuit node is directly connected to the reference circuit to receive the reference current output signal; and
wherein the summing circuit comprises a second switching circuit operative in a first state if the controller is configured as a master to connect the phase or frequency correction current output signal to the summing circuit node to offset the reference current with the phase or frequency correction current output signal for charging the capacitor, and in a second state if the controller is configured as a slave to connect the correction current output signal to the summing circuit node to offset the reference current with the correction current output signal for charging the capacitor.

15. The controller of claim 12, comprising:
an oscillator circuit generating a reference clock signal at a frequency set according to a value of a resistor connected to the oscillator circuit; and
a detector circuit generating a phase or frequency error signal representing a difference in phase or frequency between the reference clock signal and a sampled pulse width modulation output signal from the pulse generator circuit;
wherein the reference circuit provides a phase or frequency correction current output signal based on the input voltage, the value of the resistor connected to the reference circuit, and on the phase or frequency error signal from the detector circuit;
wherein the controller is configurable for use as a master or as a slave in the multi-stage DC-DC conversion system;
wherein the summing circuit includes a summing circuit node directly connected to the non-inverting input of the comparator;
wherein the summing circuit node is directly connected to the reference circuit to receive the reference current output signal and the phase or frequency correction current output signal; and
wherein the summing circuit comprises a third switching circuit connected between the transconductance amplifier and the summing circuit node, the third switching circuit operative if the controller is configured as a slave to connect the correction current output signal to the summing circuit node to offset the reference current with the phase or frequency correction current output signal and with the correction current output signal for charging the capacitor, and the third switching circuit operative if the controller is configured as a master to disconnect the correction current output signal from the summing circuit node.

16. The controller of claim 10, wherein the switched capacitor circuit comprises:
a capacitor with a first terminal connected to the summing circuit, and a second terminal connected to a circuit ground node;
a switch circuit operative in a first state to discharge the capacitor according to a switch control signal;
a comparator, including
a non-inverting input connected to the summing circuit,
an inverting input connected to a threshold voltage, and
a comparator output providing a pulse signal at a first level when a voltage across the capacitor exceeds the threshold voltage and a second level when the voltage across the capacitor is less than the threshold voltage; and
a flip-flop with a first input connected to the comparator output, a second input receiving a trigger signal to begin a new pulse width modulation period, a first output providing the pulse width modulation output signal, and a complementary second output providing the switch control signal to the switch circuit.

17. The controller of claim 16:
wherein the summing circuit includes a summing circuit node directly connected to the non-inverting input of the comparator;
wherein the summing circuit node is directly connected to the reference circuit to receive the reference current output signal; and
wherein the summing circuit node is directly connected to the correction current output signal to provide the capacitor charging current signal as the reference current output signal offset by the correction current output signal.

18. The controller of claim 16, comprising:
an oscillator circuit generating a reference clock signal at a frequency set according to a value of a resistor connected to the oscillator circuit; and
a detector circuit generating a phase or frequency error signal representing a difference in phase or frequency between the reference clock signal and a sampled pulse width modulation output signal from the pulse generator circuit;
wherein the reference circuit provides a phase or frequency correction current output signal based on the input voltage, the value of the resistor connected to the reference circuit, and on the phase or frequency error signal from the detector circuit;
wherein the controller is configurable for use as a master or as a slave in the multi-stage DC-DC conversion system;
wherein the summing circuit includes a summing circuit node directly connected to the non-inverting input of the comparator;
wherein the summing circuit node is directly connected to the reference circuit to receive the reference current output signal; and
wherein the summing circuit comprises a second switching circuit operative in a first state if the controller is configured as a master to connect the phase or frequency correction current output signal to the summing circuit node to offset the reference current with the phase or frequency correction current output signal for charging the capacitor, and in a second state if the controller is configured as a slave to connect the correction current output signal to the summing circuit node to offset the reference current with the correction current output signal for charging the capacitor.

19. The controller of claim 16, comprising:
an oscillator circuit generating a reference clock signal at a frequency set according to a value of a resistor connected to the oscillator circuit; and
a detector circuit generating a phase or frequency error signal representing a difference in phase or frequency between the reference clock signal and a sampled pulse width modulation output signal from the pulse generator circuit;
wherein the reference circuit provides a phase or frequency correction current output signal based on the input voltage, the value of the resistor connected to the reference circuit, and on the phase or frequency error signal from the detector circuit;
wherein the controller is configurable for use as a master or as a slave in the multi-stage DC-DC conversion system;
wherein the summing circuit includes a summing circuit node directly connected to the non-inverting input of the comparator;
wherein the summing circuit node is directly connected to the reference circuit to receive the reference current output signal and the phase or frequency correction current output signal; and
wherein the summing circuit comprises a third switching circuit connected between the correction current output signal and the summing circuit node, the third switching circuit operative if the controller is configured as a slave to connect the correction current output signal to the summing circuit node to offset the reference current with the phase or frequency correction current output signal and with the correction current output signal for charging the capacitor, and the third switching circuit being operative if the controller is configured as a master to disconnect the correction current output signal from the summing circuit node.

20. A method for balancing load currents provided by a plurality of DC-DC converter stages in a multi-stage DC-DC conversion system, the method comprising:
providing a reference current output signal in a given DC-DC converter stage based on an input voltage and on a value of a resistor connected to the given DC-DC converter stage; and
providing a correction current output signal representing a difference between a load current provided by the given DC-DC converter stage and an average converter stage load current in the multi-stage DC-DC conversion system;
offsetting the reference current output signal with the correction current output signal to provide a capacitor charging current signal for the given DC-DC converter stage; and
selectively charging a capacitance using the capacitor charging current to provide a pulse width modulation output signal with an on time determined by an amplitude of the capacitor charging current for the given DC-DC converter stage.

* * * * *